(12) United States Patent
Donaldson et al.

(10) Patent No.: US 7,487,402 B1
(45) Date of Patent: *Feb. 3, 2009

(54) GRACEFUL RECOVERY FROM AND AVOIDANCE OF CRASHES DUE TO NOTIFICATION OF THIRD PARTY APPLICATIONS

(75) Inventors: Jesse Donaldson, Sunnyvale, CA (US); Robert Ebert, Montepellier (FR)

(73) Assignee: PalmSource, Inc., Sunnyvale, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 10/897,264

(22) Filed: Jul. 21, 2004

Related U.S. Application Data

(63) Continuation of application No. 09/528,663, filed on Mar. 20, 2000, now Pat. No. 6,810,493.

(51) Int. Cl.
G06F 11/00 (2006.01)
(52) U.S. Cl. ........................................... 714/43
(58) Field of Classification Search ............... 714/48, 714/49, 50, 43
See application file for complete search history.

(56) References Cited

U.S. PATENT DOCUMENTS

| 4,875,160 A | * | 10/1989 | Brown, III | 712/228 |
| 5,119,483 A | * | 6/1992 | Madden et al. | 714/15 |
| 6,279,120 B1 | * | 8/2001 | Lautenbach-Lampe et al. | 714/15 |
| 6,453,430 B1 | * | 9/2002 | Singh et al. | 714/47 |
| 6,560,726 B1 | * | 5/2003 | Vrhel et al. | 714/55 |
| 6,625,754 B1 | * | 9/2003 | Aguilar et al. | 714/15 |
| 2002/0010851 A1 | * | 1/2002 | Morris et al. | 712/244 |

FOREIGN PATENT DOCUMENTS

EP 701209 A2 * 3/1996

* cited by examiner

*Primary Examiner*—Nadeem Iqbal
(74) *Attorney, Agent, or Firm*—Berry & Associates P.C.

(57) ABSTRACT

The present invention is drawn to a method and/or a system for recovering from an OS crash caused by unsuccessful event notification to a client that is typically a third party program. After the recovery from such crash, the present invention is also drawn to a method and/or a system for avoiding such OS crash in the future. Specifically, the crash recovery steps include recording the current position of the client on a client list kept by the OS. The current position is recorded in a memory location impervious to OS crashes and system reset. Once the OS crash and reboot are completed, the persistently stored current position is accessed to identified the client that was notified prior to the OS crash. The identified client is designated as an errant client, namely a client whose notification might trigger an OS crash. In turn, the errant client is removed from either the notification list or the computer system in order to prevent the client from triggering any future OS crash.

16 Claims, 10 Drawing Sheets

GRACEFUL RECOVERY FROM AND AVOIDANCE OF CRASHES DUE TO NOTIFICATION OF THIRD PARTY APPLICATIONS

This is a continuation of application Ser. No. 09/528,663 filed on Mar. 20, 2000 now U.S. Pat. No. 6,810,493 which is hereby incorporated by reference to this specification

FIELD OF INVENTION

The present invention relates to recovery from and prevention of a computer operating system (OS) crash. In particular, the present invention relates to recovery from and prevention of an OS crash caused by unsuccessful OS-level event notification to third party applications.

BACKGROUND

For a computer system, the occurrence of an event need to be communicated to the computer system's "clients." These clients are typically applications and other entities such as executable code modules and libraries that reside on the computer system. For a computer system such as a handheld device, these clients are typically third party applications. For event notification, a prior art approach is for an Event Manager to iterate through a list of clients to be notified. Specifically, for a client on the notification list, a specified routine inside the client is called. Parameters that indicate which event has occurred are passed into the specified routine.

However, this prior art approach of notifying clients is problematic in its response to an OS crash. Specifically, one of the clients may cause an OS crash in response to being notified of the event. Then, the computer system implements crash recovery steps such as a device reset and an OS reboot. The device reset may trigger the event notification process again that iterates through the client list again for notifying these clients. As such, the client that caused the OS crash prior to the OS crash could cause the OS to crash again. Consequently, the computer system could undesirably execute an infinite loop comprising steps of notification, crash, crash recovery, then back to notification, crash, crash recovery, ad infinitum.

Referring now to FIG. 1, a flow chart 10 is shown outlining steps performed in the prior art approach. These steps are performed to notify clients of an occurred event, and moreover recover from an OS crash in response to the OS crash. Flow chart 10 can be implemented as instruction code executed on a processor of a computer system. As understood herein, although the computer system is preferably a handheld device, a more generic computer system can also be used.

In step 5, a not-yet notified client on a notification list is selected to be notified about an occurred event.

In step 15, a specified routine is called within the selected client to begin notification of the occurred event to the client.

In step 20, parameters are passed into the specified routine. These parameters indicate to the client what event has occurred.

In query step 25, if the OS crashes, then step 35 is performed. Otherwise, if the OS does not crash, then step 30 is performed.

In query step 30, in response to the OS running normally after the notification to the client, a check is performed to see if all other clients on the entire notification list are notified about the occurred event. If all clients are notified, then flow chart 10 terminates. Otherwise, step 35 is performed.

In step 35, another not-yet notified client on the notification list is selected. Specifically, the newly selected client on the notification list is targeted to receive notification of the occurred event. Steps 15, 20, 25, 30 and 35 are then repeated for this newly selected client.

If in query step 25 the OS is found to crash, then OS crash recovery steps 40 and 45 are performed in response to the OS crash. In step 40, the device is reset. Then in step 45, the OS is rebooted.

In step 50, the computer system is returned to running normally. Moreover, because of the device reset, the event notification (starting from step 5) begins once again. Problematically, this notification process again notifies the client that had triggered the OS crash. In turn, the same client is likely to cause the OS to crash again. Thus, the computer system might indefinitely repeat the loop comprising the steps of 5, 15, 20, 25, 40, 45 and 50, then back again to 5, ad infinitum.

SUMMARY

A need exists for event notification to clients of the computer system without being forced into executing an infinite loop in response to an operating system (OS) crash. Furthermore, a need exists for graceful recovery from and avoidance of crashes due to unsuccessful notification of a client. As will be described, the present invention answers the needs above.

The present invention is drawn to a method and/or a system for recovering from an OS crash caused by an unsuccessful event notification to a client. After the recovery from such crash, the present invention is also drawn to a method and/or a system for preventing such OS crash in the future. In particular, the present invention provides event notification to clients of the computer system without being forced into executing an infinite loop in response to an OS crash. Furthermore, the present invention provides graceful recovery from and avoidance of crashes due to unsuccessful notification of a client.

In one embodiment, the crash recovery and prevention steps include recording the current position of the client on a notification list. The current position is recorded in a storage location impervious to OS crashes and device reset. Once the OS crash and reboot are completed, the persistently stored current position indicates the client that was being notified prior to the OS crash. With knowledge of the position of the client on the notification list, the client being notified prior to the OS crash is identified. The identified client is designated as an errant client, namely a client whose notification might trigger an OS crash. In turn, the errant client is removed from either the notification list or the computer system altogether. In so doing, the client is prevented from triggering any future OS crash.

As understood herein, the present invention is not limited to recording the current position of the client on the notification list. In another embodiment, other information is recorded in the storage location impervious to OS crashes and device reset, wherein the information is adapted for identifying the errant client.

These and other objects and advantages of the present invention will no doubt become obvious to those of ordinary skill in the art after having read the following detailed description of the preferred embodiments which are illustrated in the various drawing figures.

BRIEF DESCRIPTION OF THE FIGURES

The accompanying drawings which are incorporated in and form a part of this specification, illustrate embodiments of the invention and together with the description, serve to explain the principles of the invention.

DETAILED DESCRIPTION OF THE FIGURES

Figure 1:
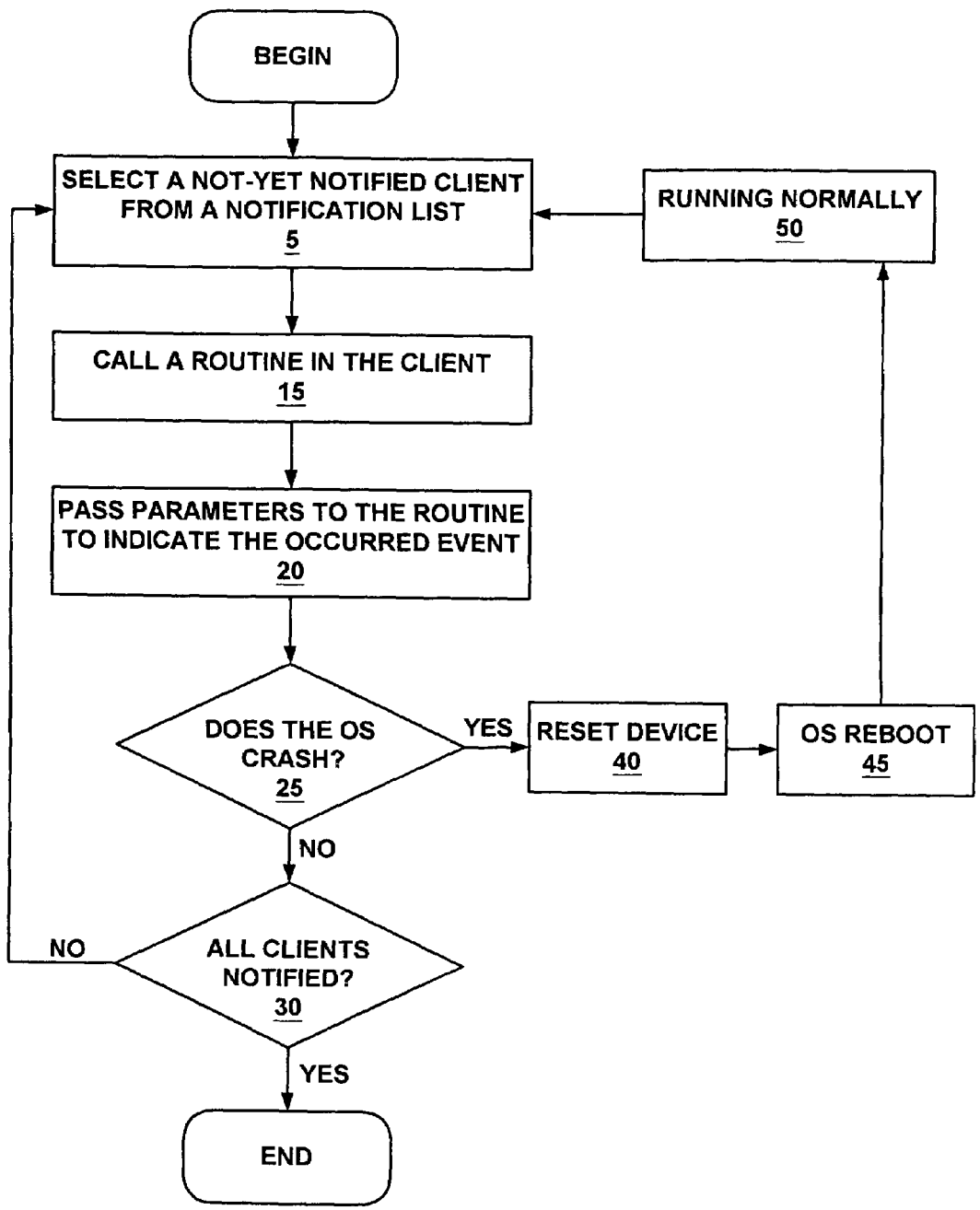
FIG. 1 is a flow chart outlining steps performed for client notification in accordance with a prior art approach.

Reference will now be made in detail to the preferred embodiments of the invention, a computer implemented process and system for event notification that provides graceful recovery from an operation system (OS) crash, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Notation and Nomenclature:

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 2:
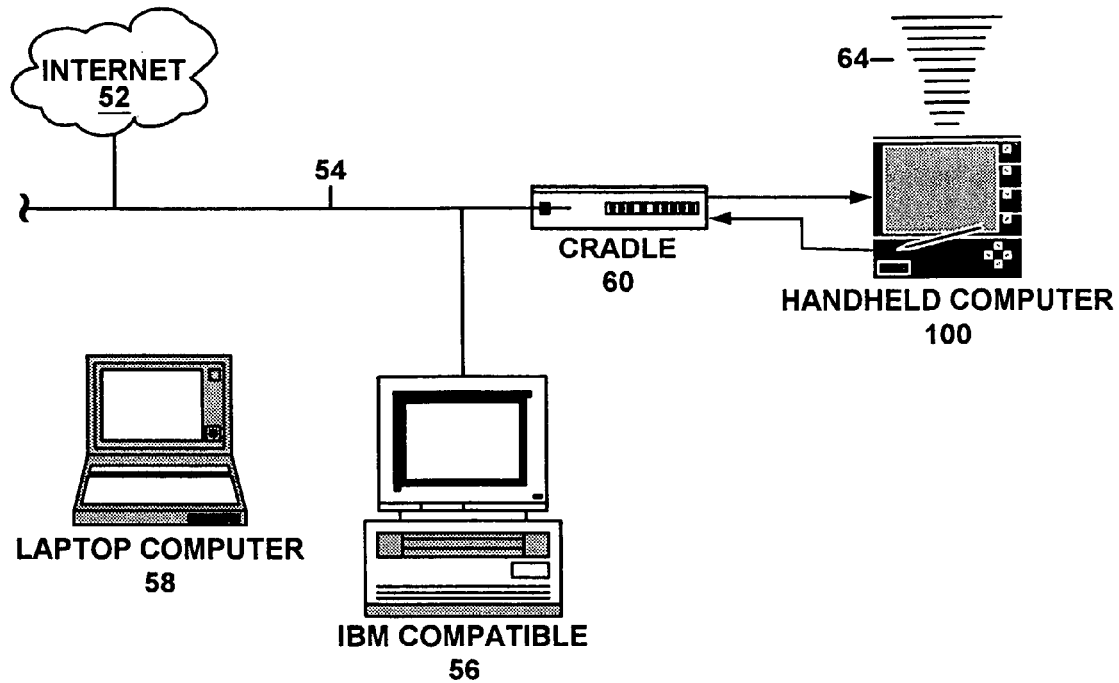
FIG. 2 is system illustration of a palmtop or "palm sized" computer system connected to other computer systems and the Internet via a cradle device.

FIG. 2 illustrates a system 50 comprising computer systems (56, 58 and 100) upon which embodiments of the present invention may be practiced. Specifically, host computer system 56 can either be a desktop unit as shown, or, alternatively, can be laptop computer system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a palm top ("palm-sized") portable computer system such as handheld computer system 100. Cradle 60 provides an electrical and mechanical communication interface between bus 54 (and anything coupled to bus 54) and computer system 100 for two way communications. Computer system 100 also contains a wireless infrared communication mechanism 64 for sending and receiving information from other devices.

Figure 3A:
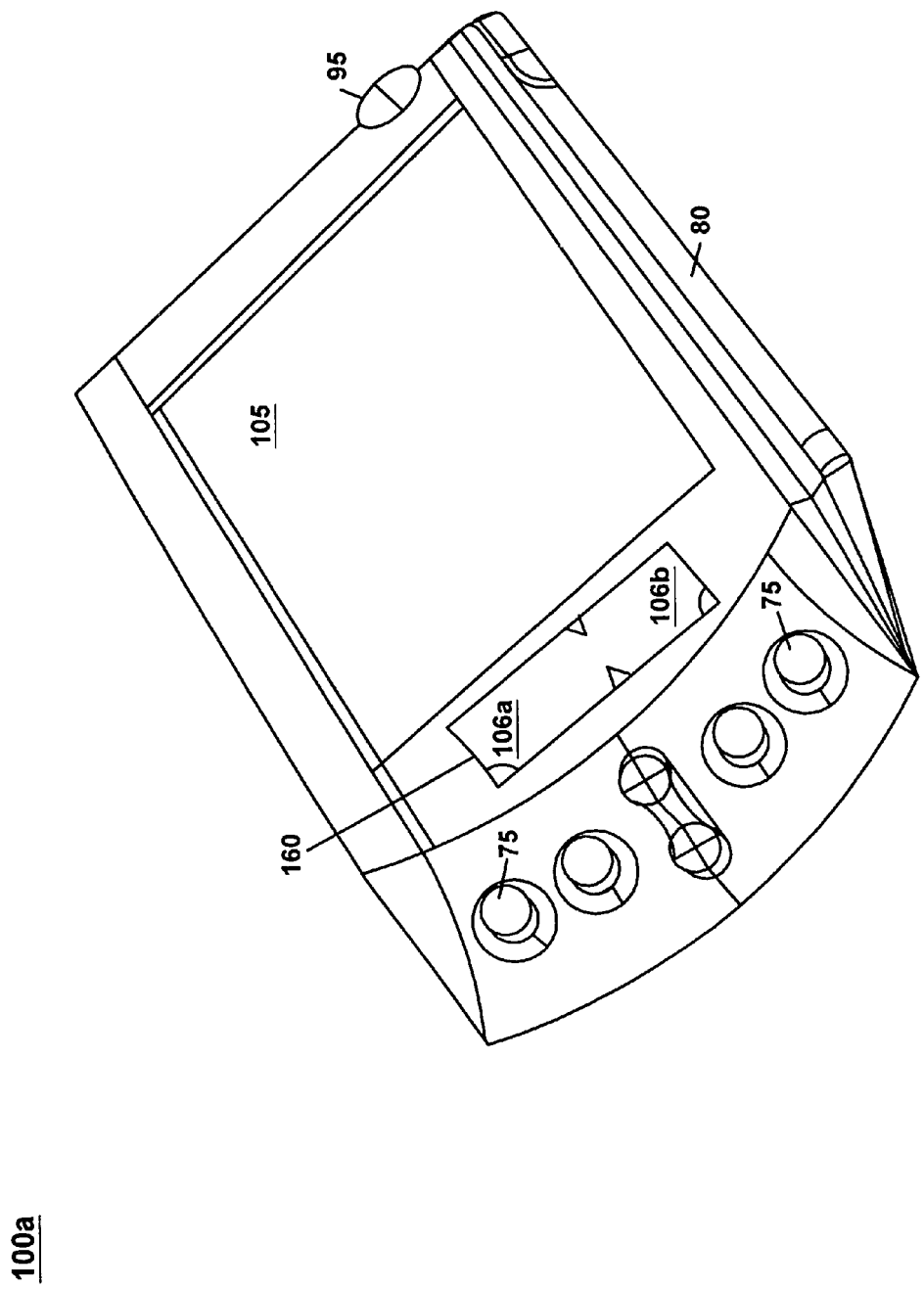
FIG. 3A is a top side perspective view of a palmtop computer system that can be used as a platform for the data entry and authentication embodiments of the present invention.

FIG. 3A is a perspective illustration of the top face 100a of one embodiment of the palmtop computer system of the present invention. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

Importantly, FIG. 3A also illustrates a handwriting recognition pad or "digitizer" containing two regions 106a and 106b. Region 106a is for the drawing of alpha characters therein for automatic recognition (and generally not used for recognizing numeric characters) and region 106b is for the drawing of numeric characters therein for automatic recognition (and generally not used for recognizing alpha characters). The stylus 80 is used for stroking a character within one of the regions 106a and 106b. The stroke information is then fed to an internal processor for automatic character recognition. Once characters are recognized, they are typically displayed on the screen 105 for verification and/or modification.

The digitizer 160 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101 (see FIG. 6). In one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. The sampled data is then stored in a memory by the processor 101 (see FIG. 6) for later analysis.

Figure 3B:
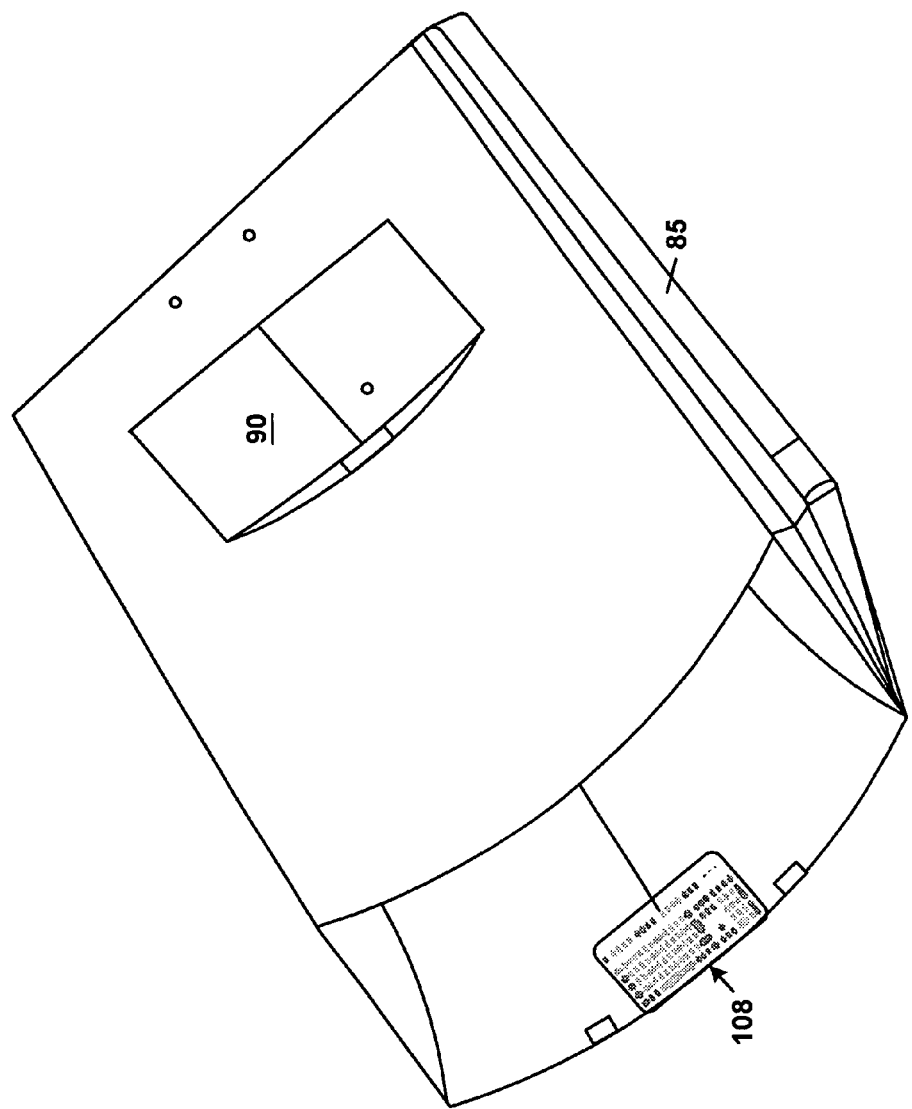
FIG. 3B is a bottom side perspective view of the palmtop computer system of FIG. 3A.

FIG. 3B illustrates the bottom side 100*b* of one embodiment of the palmtop computer system of the present invention. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc.

Figure 4:
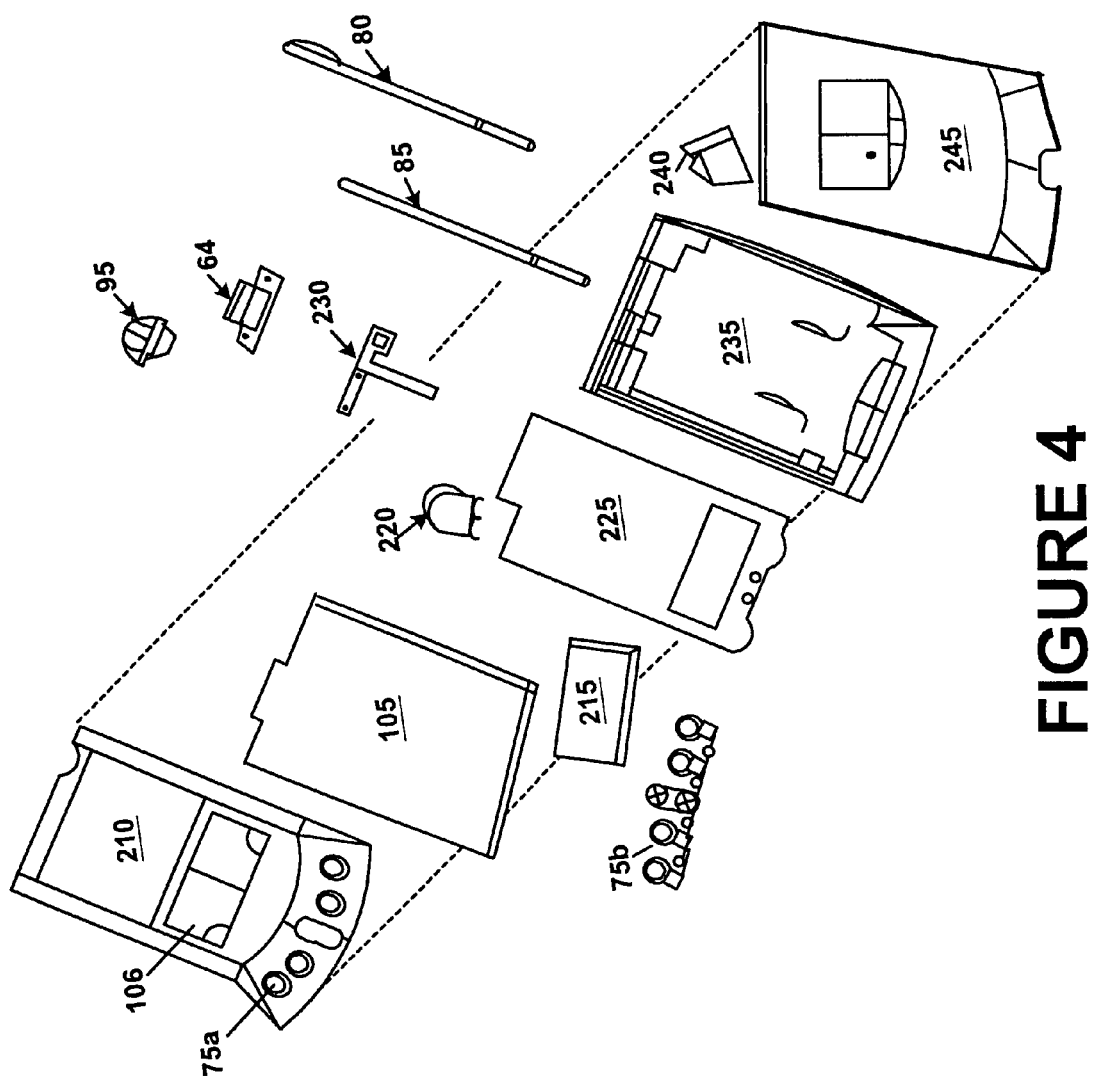
FIG. 4 is an exploded view of the components of the palmtop computer system of FIG. 3A.

FIG. 4 is an exploded view of palmtop (handheld) computer system 100 in accordance with one implementation. System 100 contains a front cover 210 having an outline of region 106 and holes 75*a* for receiving buttons 75*b*. A flat panel display 105 (both liquid crystal display and touch screen) fits into front cover 210. Any of a number of display technologies can be used, e.g., LCD, FED, plasma, etc., for the flat panel display 105. The touch screen can be a digitizer. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown.

A radio receiver/transmitter device 240 is also shown between the midframe and the rear cover 245 of FIG. 4. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server. In other embodiments, TCP protocol can be used.

Figure 5:
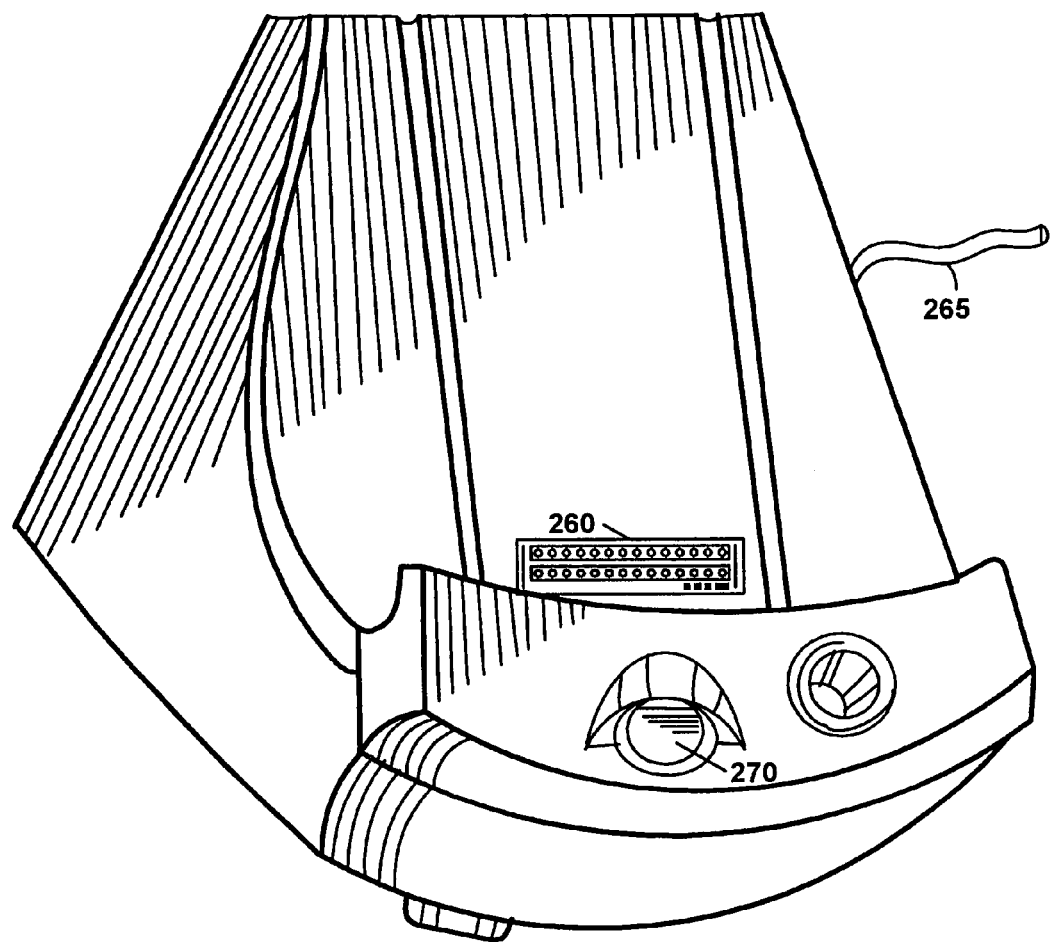
FIG. 5 is a perspective view of the cradle device for connecting the palmtop computer system to other systems via a communication interface.

FIG. 5 is a perspective illustration of one embodiment of the cradle 60 for receiving the palmtop computer system 100. Cradle 60 contains a mechanical and electrical interface 260 for interfacing with serial connection 108 (FIG. 3B) of computer system 100 when system 100 is slid into the cradle 60 in an upright position. Once inserted, button 270 can be pressed to initiate two way communication between system 100 and other computer systems coupled to serial communication 265.

Figure 6:
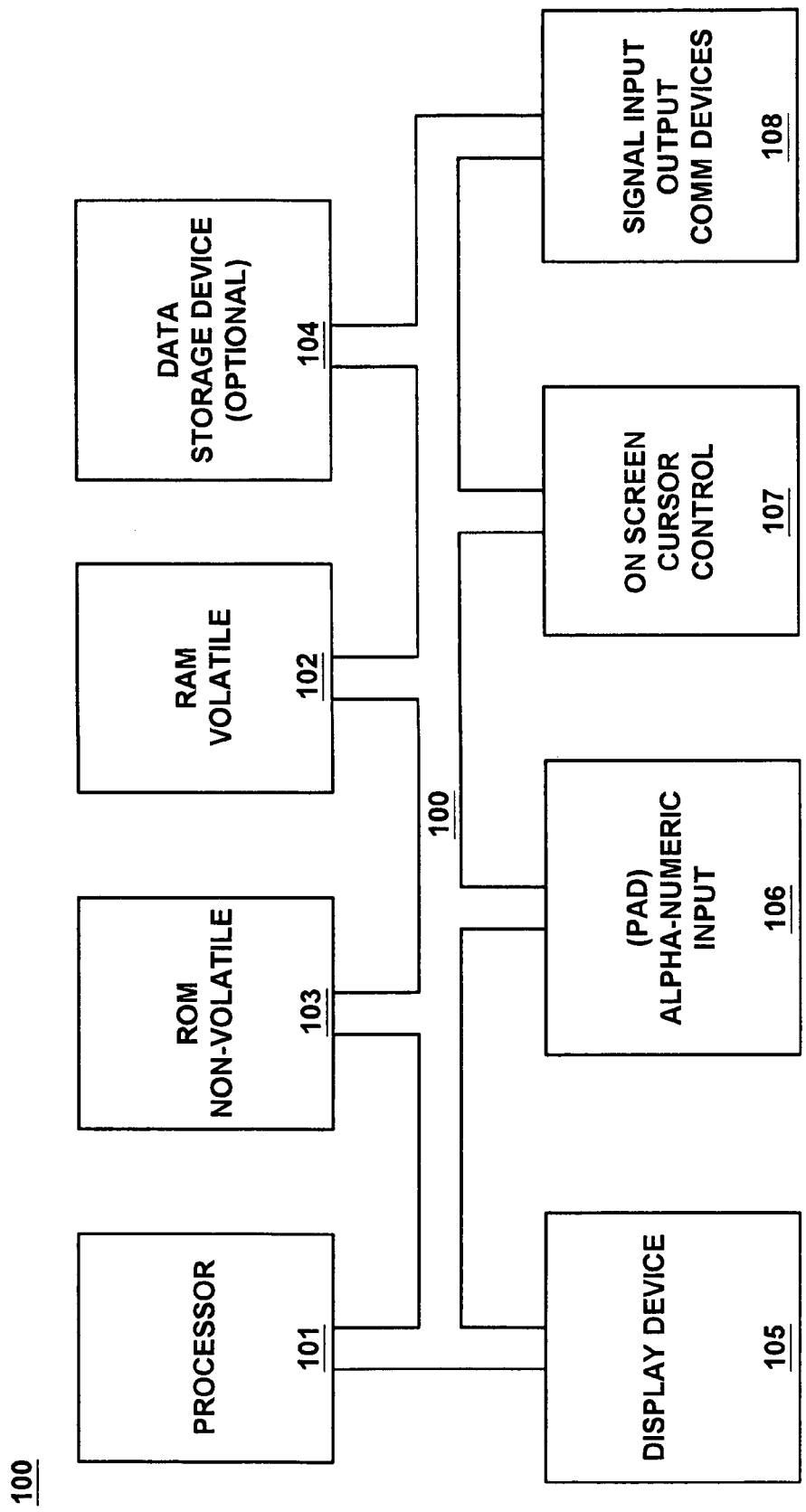
FIG. 6 is a logical block diagram of the palmtop computer system in accordance with an embodiment of the present invention.

FIG. 6 illustrates circuitry of computer system 100, some of which can be implemented on PC board 225. Computer system 100 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 110 also includes an optional data storage device 104 (e.g., memory stick) coupled with the bus 100 for storing information and instructions. Device 104 can be removable. As described above, system 100 also contains a display device 105 coupled to the bus 100 for displaying information to the computer user. PC board 225 can contain the processor 101, the bus 100, the ROM 103 and the RAM 102.

Also included in computer system 110 of FIG. 6 is an alphanumeric input device 106 which in one implementation is a handwriting recognition pad ("digitizer") having regions 106*a* and 106*b* (FIG. 3A), for instance. Device 106 can communicate information (spatial data and pressure data) and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact and the pressure of the contact. The display device 105 utilized with the computer system 110 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 100, can be a serial port for communicating with the cradle 60. Device 108 can also include an infrared communication port.

Figure 7:
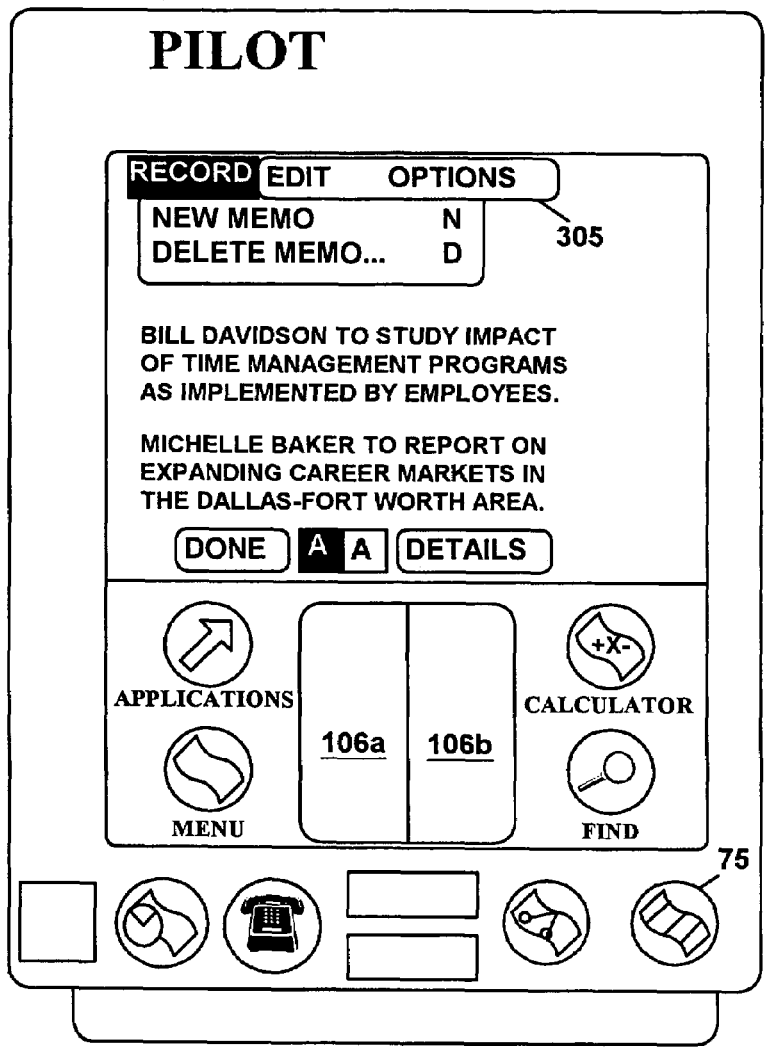
FIG. 7 is a front view of a palm top computer system illustrating the display screen, digitizer regions and an exemplary menu in accordance with the present invention.

FIG. 7 is a front view of the palmtop computer system 100 with a menu bar 305 open displaying a pull down window. Also shown are two regions of digitizer 106*a* and 106*b*. Region 106*a* is for receiving user stroke data (and pressure data) for alphabet characters, and typically not numeric characters, and region 106*b* is for receiving user stroke data (and pressure data) for numeric data, and typically not for alphabetic characters. Physical buttons 75 are also shown. Although different regions are shown for alphabetic and numeric characters, the present invention is also operable within a single region that recognizes both alphabetic and numeric characters.

Figure 8:
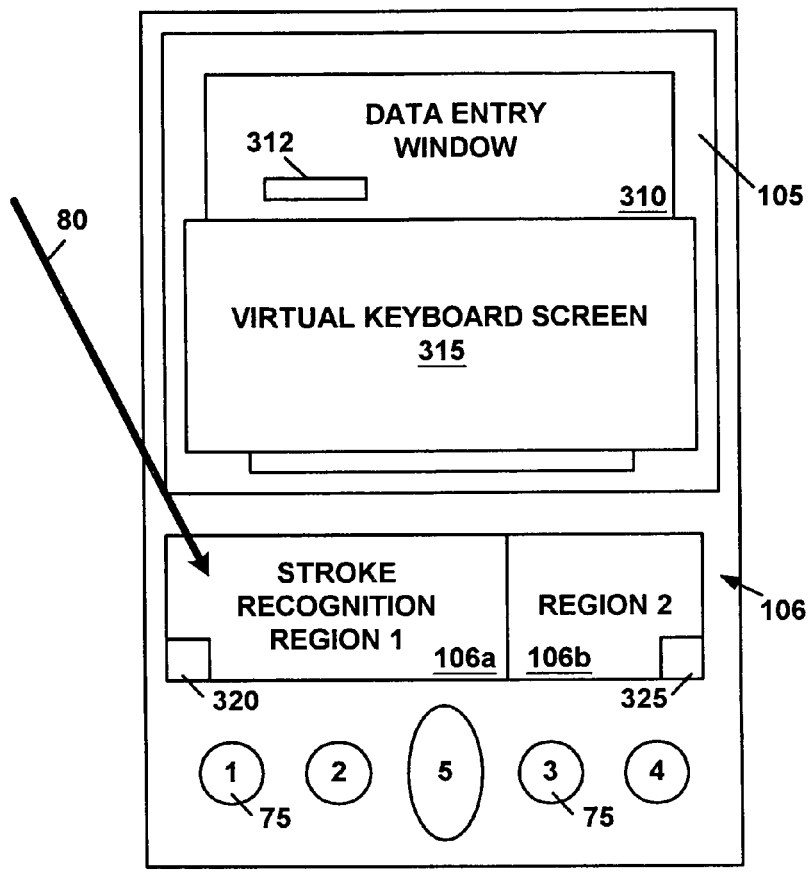
FIG. 8 illustrates a display screen showing a data entry window and a virtual keyboard window and also illustrates a handwriting recognition digitizer on the palmtop computer system in accordance with embodiments the present invention.

FIG. 8 is a front view of the palmtop computer system 100 with several display windows open on screen 105 including a virtual keyboard window 315. The user has the choice of displaying a virtual keyboard image on display 105 and entering characters by selecting one of the displayed characters of the virtual keyboard image. Window 310 is part of a generic application program executing on system 100. Window 310 is a data entry window in that the application program is requesting information to be entered by a user. The information requested and the application program could be any information and any program. Typically, data entry window 310 has at least one data entry field 312 for accepting character data therein. When not entering data using the virtual keyboard 315, the user can stroke a character within pad 106 (either region 106*a* or 106*b*) or on screen 105. The recognized character is then also placed into the displayed data entry field for user verification and use. This process can be repeated.

It is appreciated that, in one embodiment, the digitizer region 106*a* and 106*b* is separate from the display screen 105 and therefore does not consume any display area.

Figure 9:
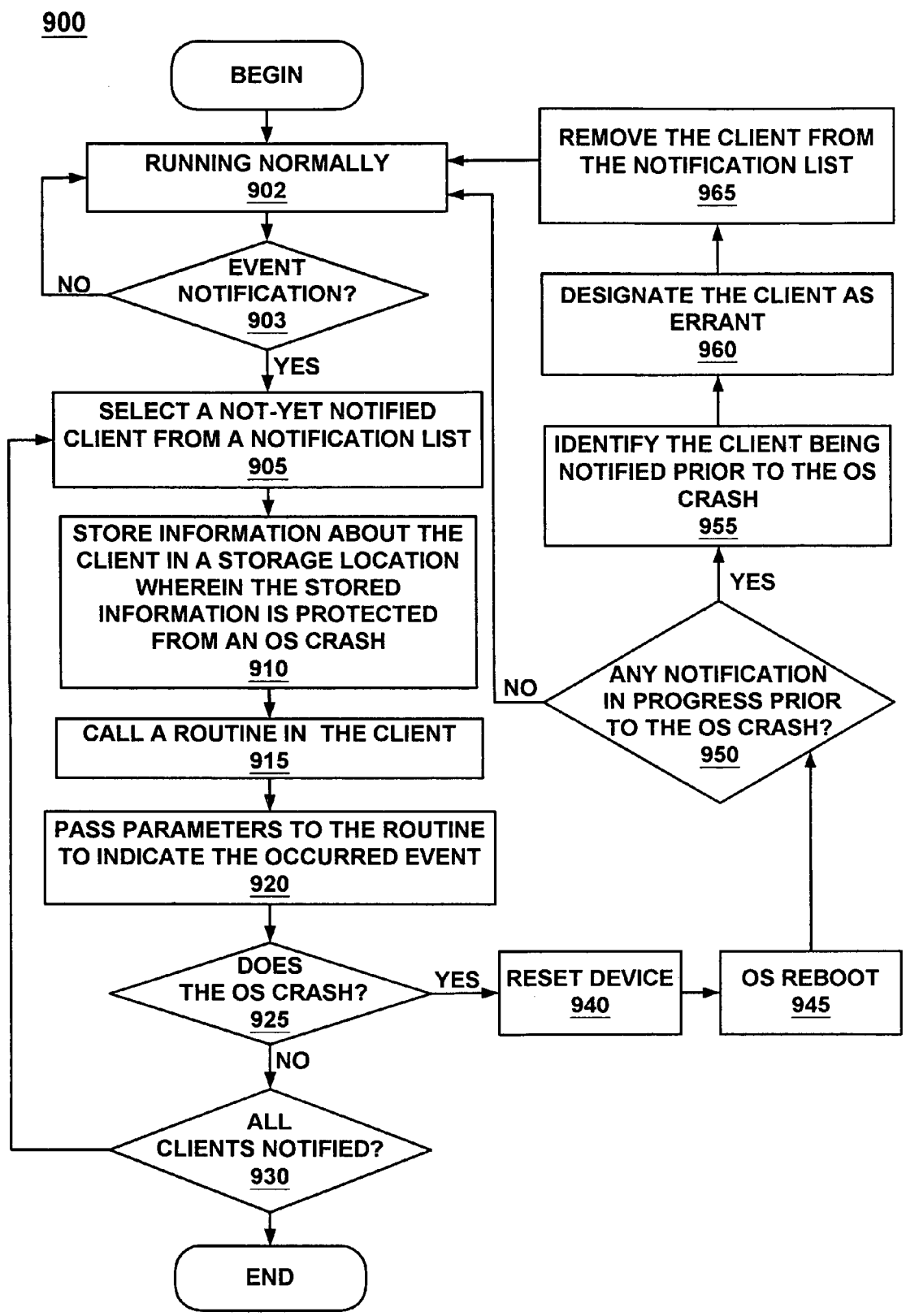
FIG. 9 is a flow chart outlining steps performed for client notification in accordance with one embodiment of the present invention.

Referring now FIG. 9, a flow chart 900 is shown outlining steps performed in accordance with one embodiment of the present invention. These steps are performed to notify clients of an occurred event, and moreover in the case of an OS crash, to recover from the OS crash without "trapping" the computer system into endlessly executing a loop of steps. Flow chart 900 can be implemented as instruction code executed on a processor of a computer system. As understood herein, although the computer system is preferably a handheld device (e.g., see computer system 100 of FIG. 2), a more generic computer system can also be used.

In step 902, the computer system is running normally.

In query step 903, a check is performed to see if an event notification is needed. If the event occurred need to be communicated to clients, then step 905 is performed. Otherwise, step 902 is performed again. As understood herein, the clients are typically libraries, native applications and third party applications.

In step 905, a not-yet notified client from a notification list is selected to be notified. This client becomes the "current" client that will be receive event notification.

In step 910, information about the current client in the notification list is stored in a storage location. This information is impervious to an OS crash because this information is stored in the storage location to persist through an OS crash. This storage location can be located, for example, in a hard disk, a disk, a CD ROM, etc. However, the storage location need not be located in a hard disk, a disk, nor a CD ROM.

Specifically, in the present embodiment, what is stored persistently in the storage location is the current position of the client relative to other clients on the notification list. This current position allows the computer system to identify, after an OS crash, which client (out of all clients on the notification list) was being notified prior to the OS crash.

As understood herein, the present invention is not limited to recording the current position of the client on the notification list. In another embodiment, other information is recorded in the storage location impervious to OS crashes and device reset, wherein the information is adapted for identifying the errant client.

In step 915, a specified routine in the client is called. This routine is executed by the client to respond to the event occurred.

In step 920, parameters are passed to the routine. These parameters indicate to the routine which event has occurred.

In query step 925, if the OS has not crashed, then query step 930 is performed. Otherwise, if the OS has crashed, then step 940 is performed to initiate recovery from and prevention of the OS crash.

In query step 930, following a successful notification, a check is performed to see if all clients on the notification list have been notified. If all clients have been notified, then flow chart 900 terminates. If not all clients have been notified, then the event notification is performed again (starting with step 905) to continue the notification process on another not-yet notified client.

If an OS crash was found in query step 925, recovery from the OS crash is performed starting with step 940. In step 940, following the OS crash found in query step 925, the computer system is reset to begin the recovery process from the OS crash. Then, step 945 follows.

In step 945, the OS is rebooted.

In query step 950, a check to the storage location is performed to see if any notification was in progress prior to the OS crash. In particular, the absence of information stored in the storage location would indicate that no event notification was in progress immediately prior to the OS crash. As such, the OS crash is likely not caused by an event notification. Thus, steps 902 and 903 are performed again, ready to respond to any request for event notification to clients. On the other hand, the presence of information stored in the storage location would indicate that event notification was in progress immediately prior to the OS crash. As such, the OS crash is likely caused by the event notification in progress to the client. Thus, steps beginning with step 955 are performed to prevent the notification of the client from possibly triggering such OS crash in the future.

In another alternative embodiment, query step 950 is performed as a part of step 945, i.e., query step 950 is made a part of the OS rebooting process.

In step 955, the client being notified just prior to the OS crash is identified through the persistently stored information (from step 910).

In step 960, the client identified as likely to cause the OS crash is designated as an errant client.

In step 965, the errant client is removed from the notification list. In so doing, the computer system avoids the risk of an OS crash due to this particular client. Optionally, the errant client is removed from the computer system altogether for avoiding an OS crash due to this particular client. Alternatively, the errant client is put on a special list rather than simply removed from the notification list or the computer system. Once on this special list, the errant client can be further scrutinized to see whether notification of this client actually has caused the OS crash. Then decision is made as to whether to remove the errant client from the notification list or the computer system. In any case, steps 902 and 903 follows step 965.

In steps 902 and 903, the computer system is back to running normally, ready to respond to another event notification to clients on the notification list.

Referring to flow chart 900 in FIG. 9 in view of FIG. 2, steps have been performed to avoid provoking the same OS crash once the crash has happened. In so doing, the present invention gracefully recovers from the OS crash without being trapped into executing an infinite loop. Moreover, as understood herein, the computer system need not be a handheld computer system 100 as described in FIG. 2. In an alternative embodiment, steps of FIG. 9 are implemented on a generic computer system such as computer systems 56 and 58 as described in FIG. 2.

In summary, the present invention recovers from an OS crash caused by an unsuccessful event notification to a client. After the recovery from such crash, the present invention prevents such OS crash in the future. Advantageously, the present invention provides event notification to clients of the computer system without being forced into executing an infinite loop in response to the OS crash. Furthermore, the present invention provides graceful recovery from and avoidance of OS crashes due to unsuccessful notification of a client.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. The scope of the invention is intended to be defined by the Claims appended hereto and their equivalents.

What is claimed is:

1. In a computer system, a method for an event notification to a client within a notification list of a plurality of clients to be notified about an event, said method comprising the steps of:
   a) storing information about said client, said information stored to persist through an operating system malfunction of said computer system;
   b) notifying said client about said event;
   c) in response to an operating system malfunction, accessing said persistently stored information to identify said client; and
   d) in response to said operating system malfunction, provided that a notification was in progress prior to said operating system malfunction, designating said identified client as an errant client.

2. The method of claim 1, wherein said b) comprises the step of:
   b1) calling a routine within said client; and
   b2) passing a plurality of parameters to said routine, said plurality of parameters indicating said event to said client.

3. The method of claim 1, wherein said errant client is adapted to be removed from said notification list to avoid future event notification of said client.

4. The method of claim 1, wherein said plurality of clients comprise libraries and native applications, executable code module and third party applications.

5. The method of claim 1, further comprising:
   e) in response to successful notification of said client, repeating a) to d) for a not-yet notified client on said notification list.

6. The method of claim 1, wherein said computer system is a handheld device.

7. A computer system having a memory, said memory storing therein a computer program for executing a method comprising the steps of:
   a) storing information about a client within a notification list having a plurality of clients to be notified about an event, said information stored to persist through an operating system malfunction of said computer system, wherein said persistently stored information records the position of said client relative to other clients of said notification list;
   b) notifying said client about said event;
   c) in response to an operating system malfunction, accessing said persistently stored information to identify said client; and
   d) in response to said operating system malfunction, provided that a notification was in progress, prior to said operating system malfunction, designating said identified client as an errant client.

8. The computer system of claim 7, wherein said errant client is adapted to be removed from said computer system to avoid future event notification of said client.

9. The computer system of claim 7, wherein said plurality of clients comprise libraries, native applications, executable code module and third party applications.

10. The computer system of claim 7, wherein said method further comprises the step of:
    e) in response to successful notification of said client, repeating a) to d) for a not-yet notified client on said notification list.

11. The computer system of claim 7, wherein said computer system is a handheld device.

12. In a handheld device, a method for notifying a client listed within a notification list of a plurality of clients to be notified about an event, said method comprising the steps of:
    a) storing information about said client, said information stored to persist through an operating system malfunction of said handheld device;
    b) notifying said client about said event;
    c) in response to an operating system malfunction, accessing said persistently stored information to identify said client; and
    d) in response to said operating system malfunction, provided that a notification was in progress prior to said operating system malfunction, designating said identified client as an errant client.

13. The method of claim 12, wherein said step b) comprises the steps of:
    b1) calling a routine within said client; and
    b2) passing a plurality of parameters to said routine, said plurality of parameters indicating said event to said client.

14. The method of claim 12, wherein said errant client is adapted to be removed from said computer system to avoid future event notification of said client.

15. The method of claim 12, wherein said plurality of clients comprise libraries, executable code module and applications.

16. The method of claim 12, further comprising the step of:
    e) in response to successful notification of said client, repeating a) to d) for a not-yet notified client on said notification list.

* * * * *